Figure 1:
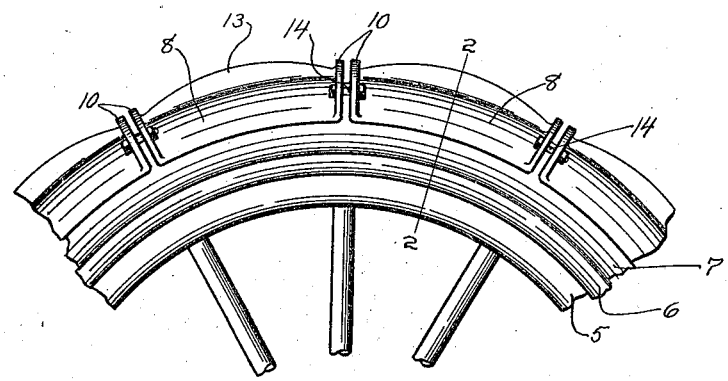

May 1, 1923.

W. A. SHUEY 1,453,530

PNEUMATIC TIRE ATTACHMENT

Filed Aug. 5, 1919

Inventor
WILLIS A. SHUEY.

by Wilkinson & Ginsta
his Attorneys

Witnesses
John B. Wade.

Patented May 1, 1923.

1,453,530

UNITED STATES PATENT OFFICE.

WILLIS A. SHUEY, OF BOISE, IDAHO.

PNEUMATIC-TIRE ATTACHMENT.

Application filed August 5, 1919. Serial No. 315,505.

*To all whom it may concern:*

Be it known that I, WILLIS A. SHUEY, a citizen of the United States, residing at Boise, in the county of Ada and State of Idaho, have invented certain new and useful Improvements in Pneumatic-Tire Attachments; and I do hereby declare the following to be a full, clear, and exact description of the invention, such as will enable others skilled in the art to which it appertains to make and use the same.

This invention relates to improvements in pneumatic tire attachments, and amongst other features broadly embodies those of an anti-skidding means as well as a protecting metallic covering or armor for the tire, to prevent punctures, cuts, abrasion and excessive wear on rough and rocky roads or streets.

While the invention may well be adapted for use on wet or slippery roads and streets, such as when covered with snow, sleet, ice, or mud, it may even more effectively function especially with reference to muddy surfaces of considerable depth, where the improvements act not only as a non-skidding means, but also actually serve to prevent the peripheral slipping of the wheels and to a large extent provide traction or propelling means for the wheels themselves, a feature of no mean importance in getting out of muddy pockets or stretches of muddy or even sandy roads.

The primary object of the invention is not only to provide such attachments which are simple in construction and operation, efficient in action, readily attachable to or detachable from any diameter of tire, and comparatively inexpensive to manufacture, but another object, and an important one, is the provision of such attachments which entirely avoid the employment of all chains, links, clamping devices or other connections for securing them to the rim of the wheel, which has heretofore been the practice and which has the disadvantages of unsightliness, clanking and rattling, and to substitute therefor a plurality of shoe sections that are slightly spaced endwise and which are firmly held bound to the tire tread, against peripheral and other displacement, wholly by positive, non-resiliently retractile, tautening connections between the shoe sections themselves. These said connections are located away from the sides of the tire so that the liability of their striking the curbstones when stopping or parking the machine and thus damaging or totally disabling them will be substantially completely eliminated.

Other objects and advantages will be so apparent as incidental to the following disclosure that it would only be undesirable surplusage to refer further to the same initially, and with this general statement, and to more fully understand the improvements, reference will now be had to the accompanying sheet of drawings, illustrating a practical embodiment of the improvements, in which drawings like reference numerals designate the same parts in the several views, of which—

Figure 3:
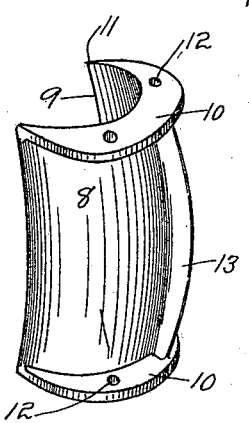
Figure 2:
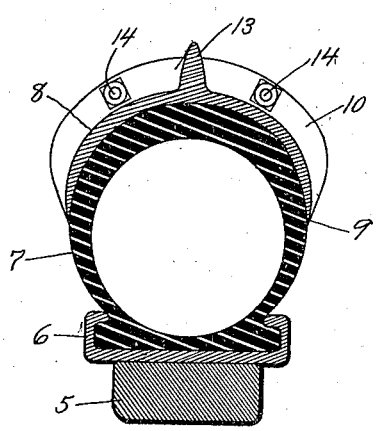
Figure 4:
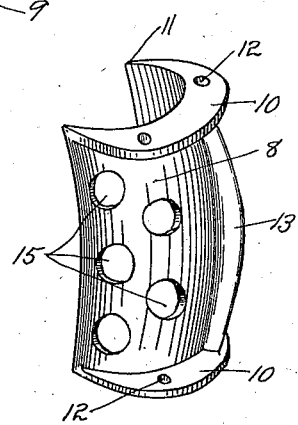

Fig. 1 is a fragmentary view in side elevation, illustrating the application of my improvements to a pneumatic tired wheel; Fig. 2 is a cross-sectional view on the line 2—2 of Fig. 1; Fig. 3 is a perspective view of one of the shoe sections detached; and Fig. 4 is a view analogous to that of Fig. 3, but showing a slightly modified form of shoe section.

The numeral 5 designates the felloe of a wheel, 6 a demountable or other form of tire holding rim, and 7 a pneumatic tire held thereby. All of these elements are only shown conventionally, as they form no part of the invention, and they may be of any of the usual constructions, simply serving in the drawings by way of illustration.

In the tread shoe construction, the specific formation of which and the manner of their attachment form the subject-matter of my improvements, 8 designates the main or body portion. This comprises a substantially semi-cylindrical metallic plate, of sufficient weight or thickness bodily for proper strength and rigidity, but which tapers off at its longitudinal edges, as indicated at 9, to insure a neat fit. This body portion 8 and its longitudinal edges 9 are also slightly curved longitudinally in a proper arc while the body portion has sufficient bulge so that the shoes snugly seat over the tread portion of the tire.

Both ends of the body portion of each shoe are provided with integrally joined exteriorly projecting lateral flange plates or blades 10 which are more or less of crescent-shape, merging at their extremities 11 into the tapered edges 9 of the body portion. These end flange plates 10 are provided with a plurality of apertures or bolt holes 12, suitably located as will hereinafter appear, for endwise connections through the medium of interposed bolts 14 and associated nuts, which bolts afford adjustable positive securing elements, being non-resiliently mounted to avoid retractile longitudinal play.

The bolt holes 12, as before stated, are suitably located, with reference to proper endwise connection of the shoe members, and to this end each end flange 10 is provided with a bolt hole substantially spaced from each side of the plane of a central longitudinal rib 13, specifically described later, and from the longitudinal edges 9 of the body portion. The adjacent end flanges are not connected together at any other positions, nor are the shoes in any other way connected together, nor to the tire or felly of the wheel, or any other part thereof.

It will be observed that the outer portions of these end flange plates 10 extend materially beyond the curved body 8, and they not only serve as traction impinging or gripping elements on hard or stony or icy surfaces but also in mud or sand, outside of the fact that they prevent peripheral slipping of the wheels they have a sort of paddle wheel effect and actually function as propelling blades for the wheels.

It will also be observed that, when the shoes are disposed in assembled relation as a peripheral series of anti-skid and armor sections around the tread of the tire, the direct endwise method of connections permits of limited independent radial play of the shoe sections, to compensate for weight pressures thereon as the wheels rotate, while at the same time clamping them firmly to the tire to prevent circumferential displacement or slipping therearound, and as these end plates are separated by from a quarter to a half inch, a nicety of adjustment and binding is provided for by tightening up or loosening of the nuts on the bolts 14.

13 designates a single rib extending in an uninterrupted manner longitudinally of the central tread portion of each shoe body, and this rib is of ridged formation, being a little higher in the center than at the ends. In fact its central portion is a trifle higher than the extreme outer edges of the end flange plates 10. The rib 13 is also formed integrally with the shoe body 8 and with the ends thereof merging into the inside faces of the end flanges, thus serving as a sort of truss element for the end flange plates 10 and as a reinforcing web for the more or less thin body portion 8 of the shoe, as well as functioning to prevent any side wash or skidding movement through the mud or the like.

The body portions of the shoes may or may not be provided with a plurality of staggered apertures 15, as shown in the modified form at Fig. 4, for the purpose of lightening the weight of the shoes; but this is not the preferred form as it might afford a medium through which the tire could be punctured by nails or the like. However both this and the preferred structure described would be substantially effective for the general purposes set forth, and furthermore the employment of either form would greatly lengthen the life of a badly worn tire.

I am aware of the fact that certain features of my invention may have been patented in somewhat analogous forms of tire shoe constructions, and I make no claims to the broad application of a series of such metallic shoes; but I am not aware that my specific form of tire shoe, with its combined association of elements, has heretofore been known to the art, nor the method of directly connecting the shoes endwise to each other so as to clamp the series to the tire proper independently of any chains, links or other fastening means engaging the rim of the wheel, which latter not only mar the appearance of the wheel but also scratch off the paint, and are generally of a more complex, troublesome and costly character.

Although having thus made a full and complete disclosure of a practical embodiment of my improvements, it may later be found expedient to make minor changes in the form and structural arrangement of elements, but without departing from the underlying principles of the invention, and it will be understood, therefore, that I do not limit myself necessarily to the exact details as illustrated and described, excepting as they may come within the purview of the ensuing claim, when fairly interpreted in the light of the specification and understood equivalents.

What I do claim, as new and patentable, is:—

In a circumferentially adjustable segmental armor for tires a plurality of members embodying suitably curved tread fitting shoe sections, the longitudinal side faces of which are free of attaching means, each of said shoe sections being formed with a transverse peripheral flange at each end, each provided with a spaced pair of bolt holes towards the top of the section ends, and a central longitudinal rib extending between and merging at its ends into said respective end flanges, in combination with means for securing said shoe sections around the tire tread, independently of their longitudinal side walls to permit of limited radial bodily play, with said end flanges adjacent and slightly spaced to permit of endwise relatively individual adjustment of each shoe section, the said securing means embodying non-resiliently mounted bolts extending through complementary pairs of the bolt holes of each adjacent pair of said end flanges, and nuts for said bolts.

In testimony whereof, I affix my signature.

WILLIS A. SHUEY.